US006460687B1

(12) United States Patent
Escobedo et al.

(10) Patent No.: US 6,460,687 B1
(45) Date of Patent: Oct. 8, 2002

(54) BUFFER WITH SERVICE LOOP AND METHOD

(75) Inventors: Sergio Escobedo; Scott Matthew Dennis, both of San Diego, CA (US)

(73) Assignee: Phogenix Imaging, LLC, San Diego, CA (US)

( * ) Notice: Subject to any disclaimer, the term of this patent is extended or adjusted under 35 U.S.C. 154(b) by 0 days.

(21) Appl. No.: 10/061,142

(22) Filed: Feb. 1, 2002

(51) Int. Cl.[7] .................................................. B65G 29/00

(52) U.S. Cl. ........................................ 198/624; 271/270

(58) Field of Search ................................ 198/604, 608, 198/620, 624; 271/270, 271, 274

(56) References Cited

U.S. PATENT DOCUMENTS 3,719,266 A * 3/1973 Korn et al. ................. 198/624
4,831,416 A * 5/1989 Benson ....................... 198/624
5,011,129 A * 4/1991 Holbrook .................... 271/274
5,301,618 A * 4/1994 Abendschein et al. ...... 198/624
5,964,462 A * 10/1999 Saltsov ....................... 198/624

* cited by examiner

*Primary Examiner*—James R. Bidwell
(74) *Attorney, Agent, or Firm*—Stephen B. Salai, Esq.; Brian B. Shaw, Esq.; Harter, Secrest & Emery LLP

(57) ABSTRACT

Disclosed is a buffer disposed to receive cut sheets from a first workstation operating at a first slower speed, deskew the sheets and deliver them to a second workstation operating at a second faster speed. The buffer has a guide defining a path of travel extending from a drive roller at a buffer inlet to a deskewing roller adjacent a buffer exit. The guide includes a trap that opens to accommodate a service loop formed of the cut sheet that is longer than the path of travel. The drive roller is driven at the first slower speed to move cut sheets into the buffer and up to the deskewing rollers and the deskewing roller is selectively driven at the second faster speed to deliver cut sheets to the second workstation. The deskewing roll is located at an elevation above the drive roller and this orientation together with the opening of the trap provides for a vertical separation between the trailing edge of a first cut sheet and the leading edge of a second cut sheet to insure there is non contact spacing between the sheets moving through the buffer.

14 Claims, 4 Drawing Sheets

BUFFER WITH SERVICE LOOP AND METHOD

TECHNICAL FIELD

The present invention relates generally to paper handling apparatus and more particularly to a buffer mechanism used in a photofinishing system for conveying a cut sheet from one work station of the system operating at a first speed to a second workstation of the system operating at a faster speed.

BACKGROUND OF THE INVENTION

In a photo finishing system of the type for which this invention relates, prints as created by an ink jet printer are dried, cut into sheets that may include one or a number of prints, and then the sheets are laminated to protect the images. The lamination process is continuous in that the laminating material is applied to the cut sheets from a continuous roll of donor material. In order to minimize waste of the laminating material, it is desirable that the space between cut sheets be as small as possible. The desire for as small a space as possible between adjacent sheets is balanced against the need to prevent the leading edge of a following sheet from contacting the trailing edge of a leading sheet during the processing of the sheets. Accordingly, while it is necessary to maintain some gap or spacing between the cut sheets, this gap preferably is as small as possible.

The lamination process requires the application of heat and pressure to the sheets to effectively carry out the lamination process. Typically, this is done with lamination rollers that provide both the heat and pressure and this dual function makes the rollers somewhat bulky. The lamination process further requires that these rollers operate at an essentially constant speed and that the rollers operate continuously. It is important that the rollers not stop during the lamination process as this could destroy a sheet of prints.

From the laminator, the sheets may be fed to an embosser to provide the photographs with a desired matte finish. Like the laminator, the embosser uses relatively heavy rollers that carry out the embossing process by producing a textured surface on the laminate. The embosser rollers may be heated and need to operate continuously to produce a satisfactory surface. Also, the embossing process tends to proceed faster than the laminating process so there is a difference in the speed at which the laminating and embossing rollers operate. Thus, the problem exists of delivering the cut sheets from the laminator to an embosser operating at a faster speed.

The cut sheets emerging from the laminator may not be perfectly aligned when they are delivered to the embosser. Passing a skewed laminated sheet through the embosser will adversely effect the quality of the finished print. Accordingly, if the sheets are skewed leaving the laminator, it is necessary to realign or "deskew" the sheets before delivering them to the embosser.

One method for deskewing is to provide a pair of transport rollers positioned to form a nip. If no corrective action is taken, a sheet of paper entering the nip at an angle will engage the rollers first at one point on the leading edge. The paper then will progressively enter the nip along the leading edge until the other side is reached so the sheet will pass through the nip in a skewed orientation. However, if the transport rollers are stopped the leading edge will butt against the nip and will align itself with the nip as the portion of the sheet immediately behind the leading edge forms a buckle or curled portion that takes up the skew. The transport rollers can then be energized to advance the now aligned sheet through the nip.

Stopping the transport rollers for a time sufficient to remove the skew at the leading edge of a first sheet causes the following sheet to close the gap between it and the trailing edge of the first sheet. Accordingly, the transport rollers must operate at a speed higher than a speed at which the cut sheets are delivered from the laminator or the buffer will fall behind, which is not acceptable.

As noted above, the operating speed of the embosser preferably is faster than the operating speed of the laminator. This arrangement allows the embosser to accept sheets from the transport roller without creating a backup. However, with the embossing process and laminating process operating at different speeds, the buffer must be long enough to accommodate the longest sheet being processed so that a sheet does not simultaneously engage the embosser rollers and the lamination rollers.

Accordingly, it is an object of this invention to provide a buffer for receiving cut sheets from a laminator in a photo finishing machine, deskewing the sheets, and delivering the sheets to an embosser.

It is another object of this invention to provide a buffer that accommodates the different operating speeds of the laminator and the embosser and provide an efficient transfer from one to the other while minimizing the gap between sheets.

While this invention is particularly well suited for the purpose just described, it will be understood that the nature of the processes that immediately precede and follow the buffer is not an element of the invention. The buffer can be used between any two processes where the requirements for receiving sheets for one process and delivering them to a second process are similar to those presented by the laminator and embosser described herein.

SUMMARY OF THE INVENTION

Briefly stated and in accordance with the presently preferred embodiment of the invention, a buffer of the present invention is disposed between a laminator and an embosser in a photo finishing machine. The buffer includes deskewing rollers forming a nip for receiving a leading edge of a cut sheet in a skewed orientation and registering the edge parallel to the rollers. Drive rollers deliver the cut sheets to the deskewing roller along a guide track at a speed equal to the output speed of the laminator.

A controller, operatively connected to the deskewing rollers and the drive rollers, stops the deskewing rollers to allow the drive rollers to move the leading edge of the cut sheet against the nip and form a slight buckle in the cut sheet. The controller then starts the deskewing rollers to advance the cut sheet partly through the deskewing roller and again stops the deskewing rollers. During all this time the drive rollers continue to feed the cut sheet to the buffer from the laminator. Stopping the deskewing rollers prevents the possibility that the leading edge of the cut sheet will enter the embosser while the trailing edge of the sheet is still in the grip of the laminator or of the drive rollers.

The guide track has a trap that opens on command from the controller so continued operation of the drive rollers forms a service loop of the cut sheet that extends through the open trap. In this fashion the buffer can accommodate a length of cut sheet that is longer than the guide track. A sensor signals the controller upon the passage of the trailing edge of the cut sheet past a fixed point. This indicates that the trailing edge of the cut sheet is free of the laminator. When this happens, the deskewing rollers are activated to turn at a faster speed that matches the operating speed of the embosser. The timing is such that the trailing edge of the cut sheet will clear the drive rollers before the service loop is depleted so the cut sheet is not put into tension by rollers operating at different speeds.

As the trailing edge of the first sheet clears the drive rollers, it drops away from the drive rollers and through the open trap to create vertical clearance between the drive rollers and the trailing edge. Due to the length of the service loop and the speed at which it is drawn by the deskewing rollers, it is possible that the leading edge of the following sheet entering between the drive rollers will overtake the trailing edge of the first sheet. Keeping the trap open and creating the vertical clearance as noted above prevents the leading edge of the following sheet from contacting the trailing edge of the first sheet. The controller keeps the trap open until a gap between the first sheet and the following sheet is reestablished and then the trap is closed so the guide track can direct the leading edge of the following sheet to the deskewing rollers.

Accordingly, the present invention may be characterized in one aspect thereof by a buffer disposed between two workstations. The buffer receives cut sheets from a first work station operating at a first speed and delivers the cut sheets to a second work station operating at a second speed faster than the first speed. The buffer acts to maintain a separation or gap between the trailing edge of a first sheet and a leading edge of a following sheet and comprises:

a) deskewing rollers at the exit defining a nip for receiving a leading edge of a first cut sheet in a skewed orientation and deskewing the leading edge to realign the leading edge parallel to the nip;

b) drive rollers at the inlet end delivering cut sheets to the deskewing rollers at a speed equal to the output speed of the first workstation;

c) a controller operatively connected to the deskewing and drive rollers, the controller being operable to stop the deskewing rollers while continuing activation of the drive rollers to engage a leading edge of a first cut sheet against the nip of the stopped deskewing rollers, form a buckle and deskew the leading edge of the first cut sheet and then activating the deskewing rollers to advance a portion of the first sheet through the nip of the deskewing rollers and then stopping the deskewing rollers all the while continuing the activation of the drive rollers to move the first cut sheet into the buffer at a speed matching the speed of the first work station;

d) a guide defining a path of travel from the drive rollers to the deskewing rollers, the guide accommodating a service loop that is longer than the path of travel, a cut sheet being formed into the service loop by continuing the operation of the drive rollers while the deskewing rollers are stopped;

e) a sensor operable to signal the controller responsive to the passage of a trailing edge of a cut sheet from the first work station;

f) the controller acting responsive to the signal for driving the deskewing rollers at the second faster speed to move a first cut sheet from the buffer and into the second work station at a speed matching the second work station speed; and g) means creating a vertical separation along the path of travel between the trailing edge of a first cut sheet and a leading edge of a second cut sheet to insure a non contact spacing between the trailing edge of the first sheet and the leading edge of the second sheet as the second cut sheet is moved by the drive rollers into the buffer at the first speed and the first sheet is being moved out of the buffer at the second faster speed.

In another aspect, the invention may be characterized by a method for buffering cut sheets moving from a first workstation operating at a first speed to a second workstation operation at a faster speed, the method comprising:

a) receiving a leading edge of a first cut sheet at a nip between stationary deskewing rollers to deskew the leading edge and form a buckle in the cut sheet adjacent the deskewing rollers;

b) advancing the first cut sheet partly through the nip and then stopping the deskewing rollers;

c) forming a service loop in the first cut sheet;

d) drawing the first cut sheet including the service loop completely through the deskewing rollers while advancing a leading edge of a second cut sheet to the deskewing rollers; and e) creating a vertical separation between the trailing edge of the first cut sheet and the leading edge of the second cut sheet to insure a non contact spacing between the trailing edge of the first sheet moving through the deskewing rollers and out of the buffer and the leading edge of a second sheet moving into the buffer and towards the deskewing rollers.

DETAILED DESCRIPTION OF THE INVENTION

Figure 1:
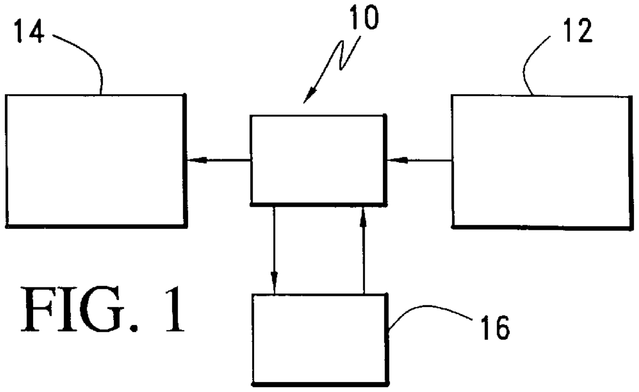
FIGS. 1 is a block diagram showing the position of the buffer of the present invention.

Referring to the drawings, FIG. 1 shows a buffer according to the present invention generally indicated at 10 disposed between a first upstream workstation 12 and a second downstream workstation 14. The operation of the buffer is under control of a controller 16 as further described hereinbelow. The buffer as described herein is for use in a photofinishing operation wherein the first workstation is a laminator and the second workstation is an embosser, all components being part of a photofinishing system. Neither the laminator nor the embosser is part of the present invention so they will not be described in detail. It is sufficient to say that when an inkjet printer is used in a photofinishing operation, it is preferred that individual printed sheets be laminated with a clear protective material, usually a plastic sheet.

Figure 2:
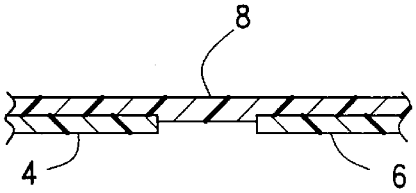
FIG. 2 is a view in cross section showing laminated sheets prior to separation.

For efficient operation, the lamination material is drawn from a roll and laid onto one or both surfaces of printed sheets individually fed to the laminator. To minimize waste of the lamination material, the gap or spacing between the individual printed sheets fed to the laminator is kept as small as possible. The result, as shown in FIG. 2 is a continuous piece comprising two adjacent printed sheets 4 and 6 connected by a layer of the laminate material 8. On leaving the laminator the continuous piece is cut between the adjacent printed sheets 4, 6 to again separate the individual printed sheets.

After the lamination is applied and the sheets are cut apart, the cut sheets are delivered to an embosser that puts a matte finish to the cut sheet. Generally the embosser operates at a faster speed than the laminator so one function of the buffer is to receive cut sheets from the laminator (first workstation) operating at a first speed and deliver the cut sheets to the embosser (second workstation) operating at a faster speed. Another function of the buffer is to insure that a cut sheet is completely free of the laminator before being delivered to the embosser. This is because damage can result to a cut sheet having one end in the grip of the laminator operating at one speed and another end in the grip of the embosser operating at a faster speed.

Figure 3:
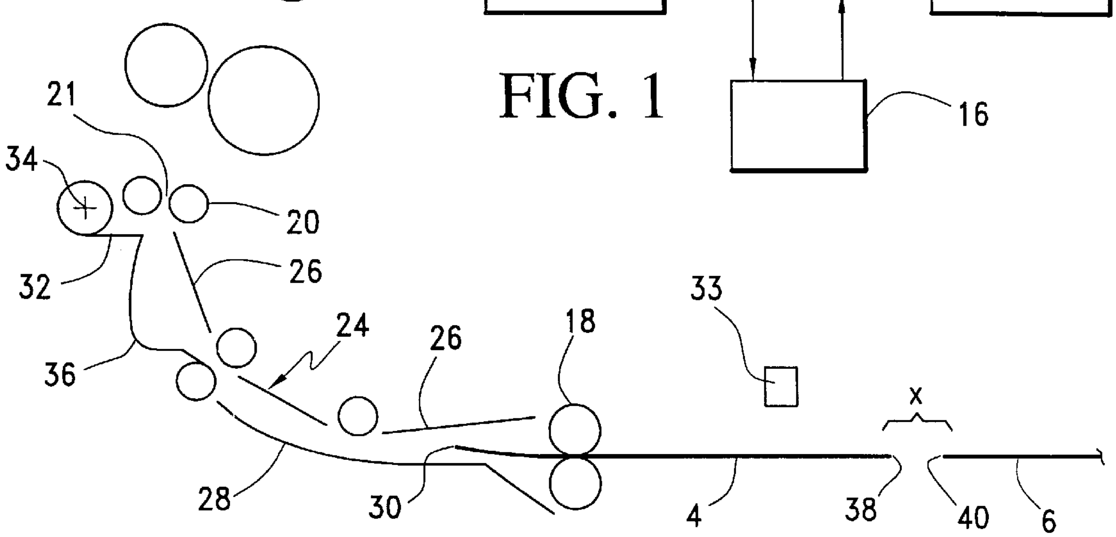
FIGS. 3–11 are views showing a portion of the buffer at successive operational steps.

As shown in FIG. 3, the buffer has a set of driven inlet rollers 18, a set of deskewing rollers 20 and a set of outlet rollers 22. The inlet rollers 18 are driven at the same operational speed as the laminator. The outlet rollers 22 are driven at the same operational speed as the embosser and the deskewing rollers are driven at a selected speed. Preferably, inlet rollers 18 are disposed at a lower elevation in the buffer than the deskewing and outlet rollers.

A guide 24 composed of spaced upper and lower members 26, 28 respectively defines a path of travel between the inlet rollers and the nip 21 formed by the deskewing rollers. Since the deskewing rollers are disposed above the inlet rollers 18, the guide 24 defines a path of travel that curves upward to deskewing rollers 20 from the inlet rollers 18. Thus a cut sheet 4 passing from the laminator 12 and entering the buffer through inlet rollers 18, has its leading edge 30 directed to the deskewing rollers 20.

The lower member 28 of the guide has an end 32 adjacent the deskewing rollers 20 fixed for rotation about an axis 34. Adjacent its end 32, the guide member 28 is formed with a dogleg 36 for purposes set out hereinbelow. Completing the structure is a sensor 33 that issues a signal to controller 16 upon the passage of the trailing edge of a cut sheet. The location of the sensor is such that passage of the trailing edge of a cut sheet signifies that the cut sheet is free of the grip of the laminator.

The operation of the buffer will be described as beginning with FIG. 3, which shows the leading edge 30 of a laminated cut sheet 4 as passing between the drive rollers 18 and entering the buffer. As noted hereinabove, drive rollers 18 operate at the same speed as the laminator. This insures that the portion of the cut sheet 4 in the grip of drive rollers 18 moves at the same speed as a trailing edge 38 of the cut sheet that may still be in the grip of the laminator. Also shown in FIG. 3 for purposes of illustration is a second cut sheet 6 that follows the first sheet and has its leading edge 40 spaced from the trailing edge 38 of the first sheet by a distance “x”.

Figure 4:
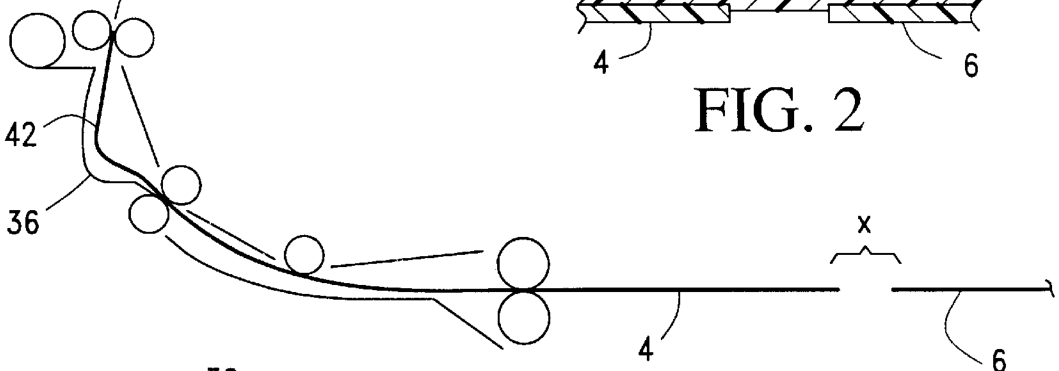

The guide 24 leads the sheet 4 to the deskewing rollers 20. At this time the deskewing rollers are stopped. Eventually the leading edge 30 of the sheet contacts the nip 21 formed by the deskewing rollers while the drive rollers 18 continue to operate. This causes a portion 42 of the sheet adjacent the leading edge to buckle as shown in FIG. 4. The buckle is accommodated by the dogleg 36 in the lower portion of the guide. As the sheet buckles, the buckle takes up any skew of its leading edge relative to the nip 21 so that the leading edge becomes aligned with the nip. In this fashion a sheet that may be skewed upon entering the buffer is deskewed by the buffer and the leading edge is realigned parallel to the nip so that a properly orientated sheet is delivered to the embosser or downstream workstation.

Figure 5:
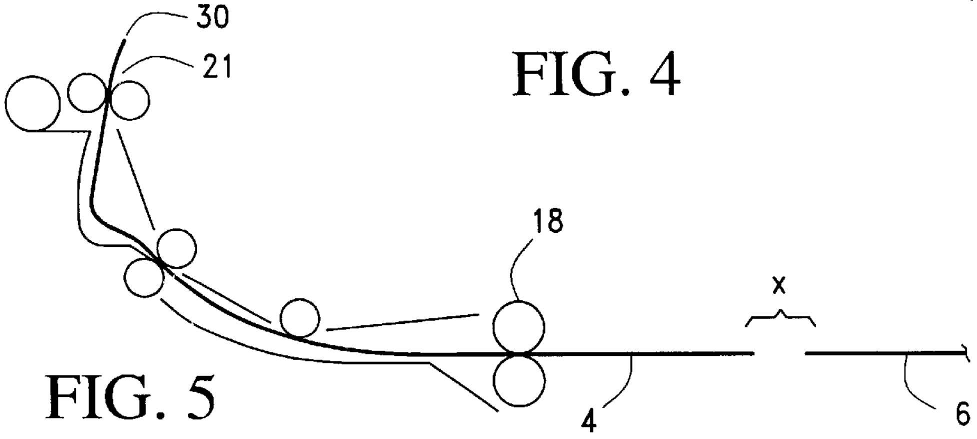

After the deskewing operation is complete, the controller 16 momentarily activates the deskewing rollers 20 to allow the leading edge 30 and a small portion of the sheet to pass through nip 21 (FIG. 5). For this operation the deskewing rollers are driven at the same speed as the drive rollers 18. After the momentary activation, the deskewing rollers are stopped. In this fashion the nip of the deskewing rollers holds the sheet while the drive rollers continue to operate to move the cut sheet 4 into the buffer at the same speed as the operational speed of the laminator. The deskewing rollers 20 are stopped while the drive rollers continue to operate to avoid a situation where a long cut sheet might extend into the outlet rollers 22 (that move at a faster speed) while part of the cut sheet is still in the grip of the drive rollers 18.

Figure 6:
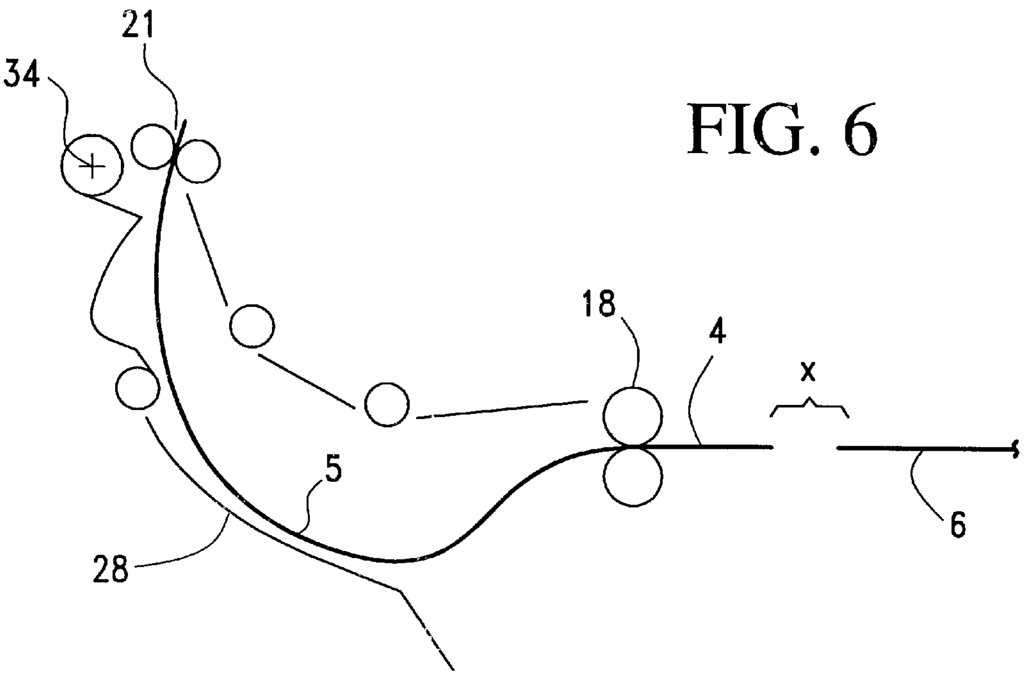

Since a length of a cut sheet may be longer than the length of the path of travel defined by guide 24, some room must be made for the length of sheet being moved into the buffer while the deskewing rollers are stopped. Accordingly, the controller acts to rotate the lower portion 28 of the guide about the axis 34 so a trap in the guide is opened (FIG. 6). With the trap open, a length of the sheet driven into the buffer can bow out into the space created by the opening. In this way the buffer can accommodate a length of the sheet by causing a service loop 5 to form that is much longer than the length of the path of travel defined by the guide 28. The length of the service loop ($L_{SL}$) between the drive rollers 18 and the nip 21 equals the length of the path of travel with the trap closed ($L_C$) plus the speed ($V_L$) of the driving rollers 18 multiplied by the time that the deskewing rollers are stopped ($T_1$) or $L_{SL}=L_C+(V_L \times T_1)$.

Figure 7:
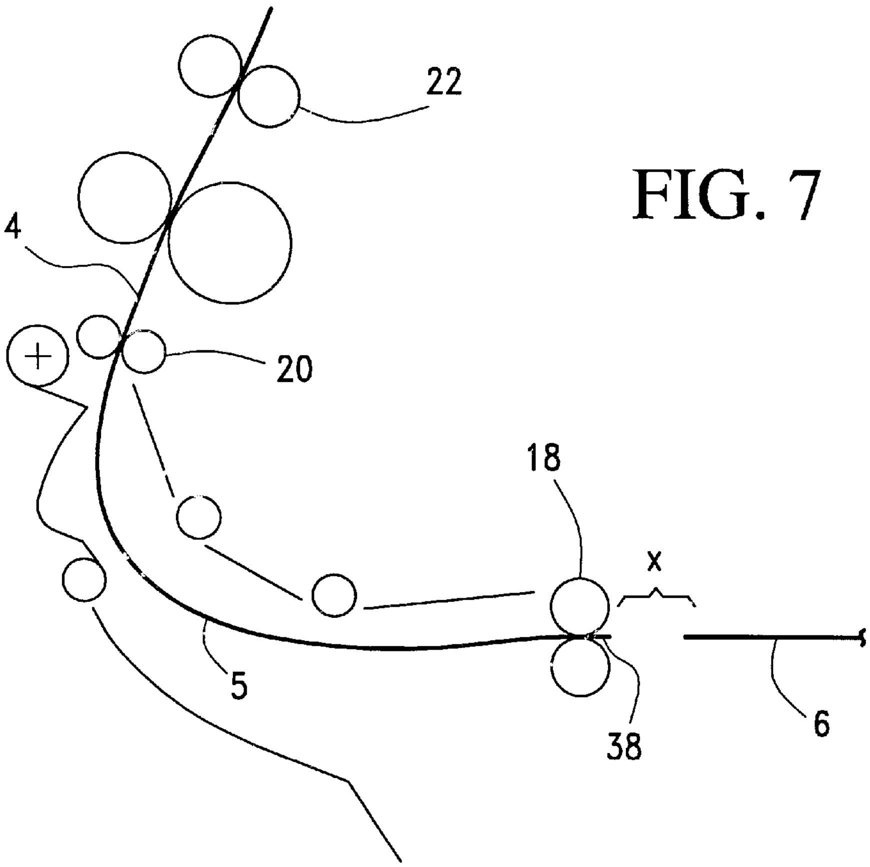

At some point, the sensor 33 will identify the passing of the trailing edge 38 of the cut sheet signifying that the cut sheet is out of the laminator. When this occurs, controller 16 activates the deskewing roller for operation at a speed equal to the processing speed of the embosser or downstream workstation. This action takes up the slack provided by the service loop 5 and begins to move the cut sheet 4 through the driven outlet rollers 22 and into the embosser (FIG. 7). It is possible that the deskewing rollers can be activated to turn at the faster operating speed of the embosser before the trailing edge of the cut sheet is clear of the slower moving drive rollers. However, the controller insures that the slack provided by the service loop, that is the length of the service loop, contains a length sufficient to prevent the slack from being depleted prior to the time the trailing edge 38 of the first cut sheet clears the drive rollers. This avoids a situation where the cut sheet is put into tension between the drive rollers 18 operating at one speed and the deskewing rollers 20 operating at a faster speed.

As described above, the deskewing rollers draw the cut sheet from the service loop at a speed faster than the speed at which the following sheet 6 is delivered to the buffer. However, the length of the first sheet may be such that time does not permit the removal of a sufficient length of the first sheet 4 to prevent the following sheet 6 from catching up to the first sheet at some point along the path of travel. In other words the length of the gap “x” between the sheets could be reduced to a negative number before the first sheet is out of the buffer. This means that the leading edge 40 of the second or following sheet 6 will run into the trailing edge 38 of the first or leading sheet 4. Keeping the trap open avoids this situation.

Figure 8:
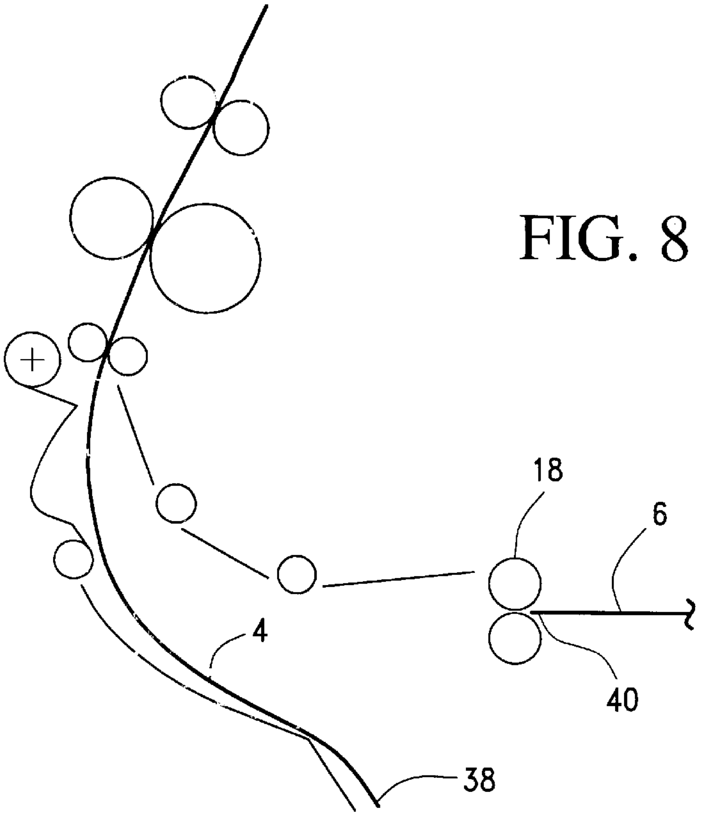
Figure 9:
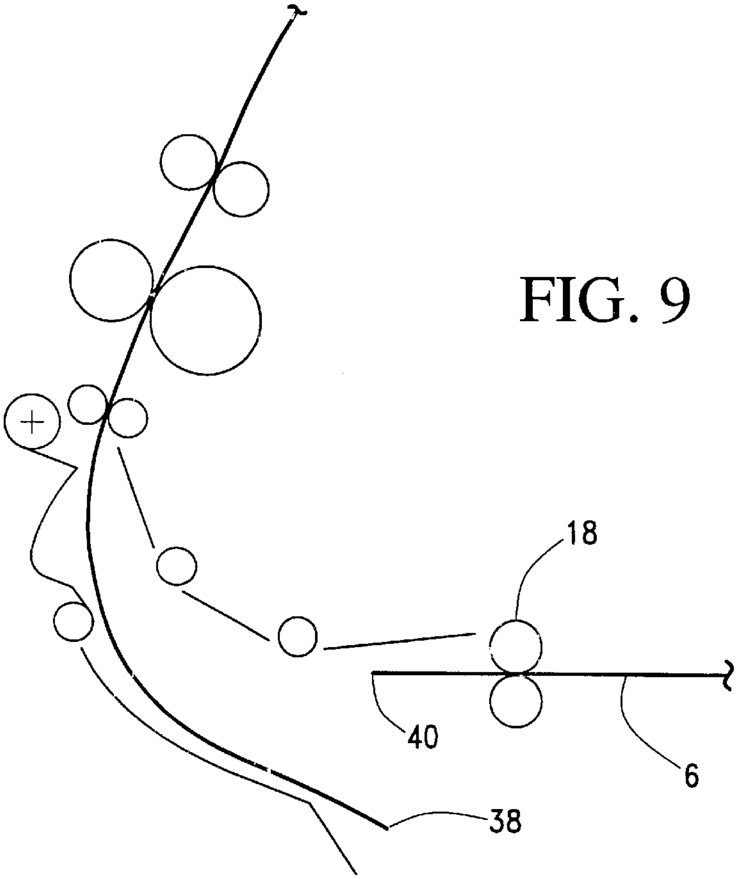

As shown in FIG. 8, the trailing edge 38 of the first sheet 4 as it clears the drive rollers 18 will drop from the drive rollers and leave the defined path of travel. This is because the location of the deskewing rollers at a higher elevation than the drive rollers 18 and the curvature of the path of travel cause the trailing edge 38 of the cut sheet to spring downwards and away from the drive rollers. Now when the leading edge 40 of the following sheet passes through the nip at the drive rollers 18, it will be vertically displaced from the trailing edge of the first sheet as shown in FIG. 9. This displacement avoids an overlap that could cause the two sheets to contact.

If the length of the leading sheet 4 is such that no over lap is created with the leading edge of the following sheet, the trap can be closed. Conversely, if the length of the first sheet is such that there is an overlap with the following sheet, the trap will remain open to allow time for the first sheet to "run away" from the following sheet before the trap is closed. The over lap can be calculated using the formula $$\text{Overlap}=(L_R-L_c)-(x)(V_E)/V_L$$

Where $L_R$=length of service loop when the trailing edge of the first sheet leaves the laminator $L_c$=the length of the path of travel with the trap closed "x"=length of the initial gap between the sheets $V_E$=the speed of the embosser and $V_L$=the speed of the laminator.

If the overlap is calculated to be a negative number, there is no over lap and the trap can close as soon as the length of the service loop is less than the length of the path of travel with the trap closed. If the calculation yields a positive number, the sheets would overlap so the trap must remain open and allow the first sheet to move away from the following sheet.

Figure 10:
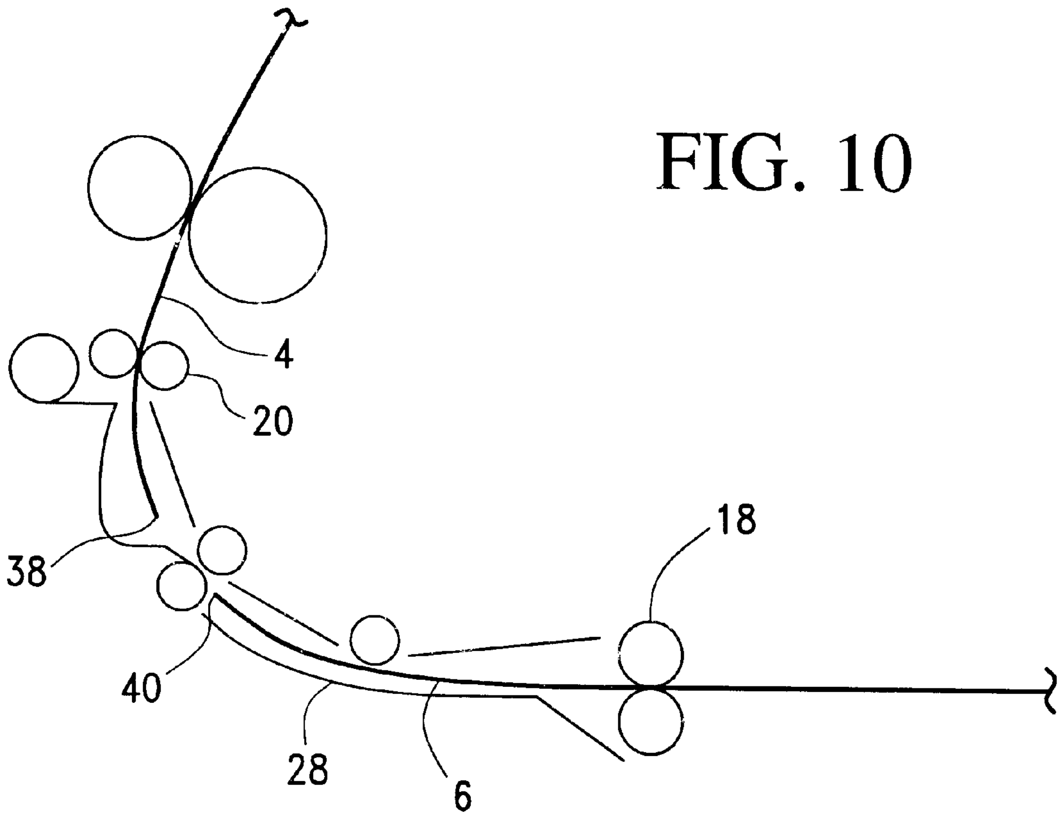
Figure 11:
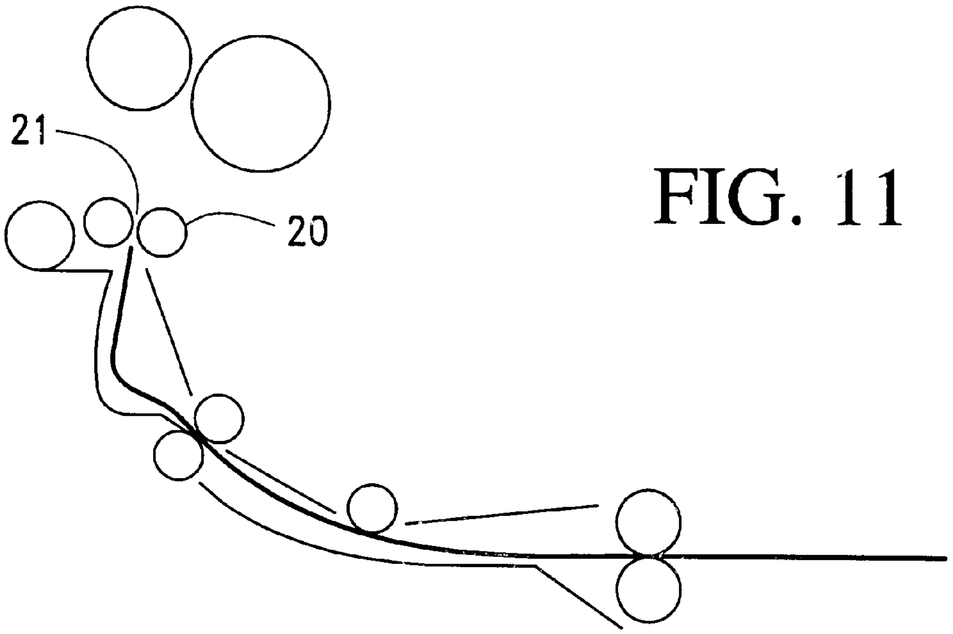

After a time, there is a removal of the first sheet by the deskewing rollers 20 sufficient to reestablish a gap between the two sheets. When this happens the controller causes the lower guide portion 28 to close as shown in FIG. 10. This reestablishes the path of travel for guiding the leading edge 40 of the second sheet 6 to the deskewing rollers 20. After passage of the first sheet from the buffer, these rollers are stopped and the action repeated to deskew the following sheet 6 as shown in FIG. 11.

Thus it should be appreciated that the present invention provides a buffer disposed between workstations that have different operational speeds that can accommodate a cut sheet entering at one operational speed and then pass it out of the buffer at a second operational speed. The buffer further is able to stop and deskew a sheet while preventing a trailing sheet from running into a leading sheet. The buffer is able to accommodate sheets of various lengths including sheets longer than a path of travel through the buffer.

Having described the invention in detail, what is claimed as new is:

1. A buffer for receiving cut sheets at an inlet from a first work station operating at a first speed and delivering the cut sheets through an exit to a second work station operating at a second faster speed while deskewing the sheets and maintaining a gap between the trailing edge of a first sheet and a leading edge of a following sheet, the buffer comprising:

a) deskewing rollers at the exit defining a nip for receiving a leading edge of a first cut sheet in a skewed orientation and deskewing the leading edge to realign the leading edge parallel to the nip;

b) drive rollers at the inlet end delivering cut sheets to the deskewing rollers at a speed equal to the output speed of the first workstation;

c) a controller operatively connected to the deskewing and drive rollers, the controller being operable to stop the deskewing rollers while continuing activation of the drive rollers to engage a leading edge of a first cut sheet against the nip of the stopped deskewing rollers, form a buckle and deskew the leading edge of the first cut sheet and then activating the deskewing rollers to advance a portion of the first sheet through the nip of the deskewing rollers and then stopping the deskewing rollers all the while continuing the activation of the drive rollers to move the first cut sheet into the buffer at a speed matching the speed of the first work station;

d) a guide defining a path of travel from the drive rollers to the deskewing rollers, the guide accommodating a service loop that is longer than the path of travel, a cut sheet being formed into the service loop by continuing the operation of the drive rollers while the deskewing rollers are stopped;

e) a sensor operable to signal the controller responsive to the passage of a trailing edge of a cut sheet from the first work station;

f) the controller acting responsive to the signal for driving the deskewing rollers at the second faster speed to move a first cut sheet from the buffer and into the second work station at a speed matching the second work station speed; and g) means creating a vertical separation along the path of travel between the trailing edge of a first cut sheet and a leading edge of a second cut sheet to insure a non contact spacing between the trailing edge of the first sheet and the leading edge of the second sheet as the second cut sheet is moved by the drive rollers into the buffer at the first speed and the first sheet is being moved out of the buffer at the second faster speed.

2. A baffle as in claim 1 wherein said guide comprises:

a) spaced upper and lower members defining a path of travel therebetween for receiving and guiding a cut sheet to the nip of the deskewing rollers; and b) the lower member including a pivotally connected trap and the trap being opened to accommodate the service loop.

3. A buffer as in claim 1 wherein the deskewing rollers are disposed at an elevation above the drive rollers the guide defines an arcuate path of travel from the drive rollers to the deskewing rollers.

4. A buffer as in claim 3 wherein the guide comprises:

a) spaced upper and lower members which are substantially coextensive and together define the arcuate path of travel; and b) the lower member including a pivotally connected trap and the trap being opened to accommodate the service loop.

5. A buffer as in claim 4 wherein the trap is opened on command from the controller to accommodate a length of a cut sheet in the service loop that is longer than the path of travel.

6. A buffer as in claim 3 wherein the trap, when open, comprises the means creating a vertical separation between the trailing edge of the first cut sheet and the leading edge of a second cut sheet.

7. A buffer for receiving cut sheets from a first workstation and delivering the cut sheets to a second workstation comprising:

a) stationary deskewing rollers defining a nip receiving a leading edge of a first cut sheet in a skewed orientation and deskewing the leading edge to realign the leading edge parallel to the nip;

b) a controller activating the deskewing rollers after deskewing to advance the first cut sheet partly through the nip and then stopping the deskewing rollers;

c) drive rollers moving cut sheets from the first work station and into the buffer, the drive rollers being operable while the deskewing rollers are stopped to form a portion of the cut sheet to a service loop extending between the deskewing rollers and the drive rollers;

d) the controller operating responsive to the passage of a trailing edge of the first cut sheet from the first work station to activate the deskewing rollers to draw the service loop in the first cut sheet completely through the deskewing rollers while the drive rollers advance a leading edge of a second cut sheet to the deskewing rollers; and e) means creating a vertical separation between the trailing edge of the first cut sheet and the leading edge of the second cut sheet to provide a non contact spacing between the trailing edge of the first sheet moving through the deskewing rollers and out of the buffer and the leading edge of a second sheet moving into the buffer and towards the deskewing rollers.

8. A buffer as in claim 7 wherein:

a) the first work station operates at a first slower speed and the second workstation operates at a second faster speed; and b) the controller operates the drive rollers at the first slower speed and operates the deskewing rollers at the second faster speed.

9. A buffer as in claim 8 comprising:

a) a guide defining a path of travel from the drive rollers to the deskewing rollers, the guide having spaced upper and lower members defining a path of travel therebetween; and b) the lower member having a trap that is opened to accommodate the service loop.

10. A buffer as in claim 9 wherein the deskewing rollers are disposed at an elevation higher than the drive rollers and the guide defines an arcuate path of travel from the drive rollers to the deskewing rollers, the higher elevation of the deskewing rollers and the arcuate path together causing the trailing edge of a first cut sheet to spring downward after passing through the drive rollers thereby creating a vertical separation between the trailing edge of the first cut sheet and the leading edge of the second cut sheet.

11. A method for buffering cut sheets between a first workstation and a second workstation comprising:

a) receiving a leading edge of a first cut sheet at a nip between stationary deskewing rollers to deskew the leading edge and form a buckle in the cut sheet adjacent the deskewing rollers;

b) advancing the first cut sheet partly through the nip and then stopping the deskewing rollers;

c) forming a service loop in the first cut sheet;

d) drawing the first cut sheet including the service loop completely through the deskewing rollers while advancing a leading edge of a second cut sheet to the deskewing rollers; and e) creating a vertical separation between the trailing edge of the first cut sheet and the leading edge of the second cut sheet to insure a non contact spacing between the trailing edge of the first sheet moving through the deskewing rollers and out of the buffer and the leading edge of a second sheet moving into the buffer and towards the deskewing rollers.

12. A method as in claim 11 wherein drawing the cut sheet completely through the deskewing rollers occurs at a speed faster than the speed of advancing the leading edge of a second sheet to the deskewing rollers.

13. A method as in claim 11 wherein receiving a leading edge of a first cut sheet at the nip between stationary deskewing rollers occurs at a speed slower than the drawing of the cut sheet completely through the deskewing rollers.

14. A method as in claim 11 wherein the first workstation operates at a first slower speed and the second workstation operates at a second faster speed, the receiving step and the step of partly advancing the cut sheet through the deskewing rollers being at the first slower speed and drawing the cut sheet completely through the deskewing rolls being at the second faster speed.

* * * * *